(12) United States Patent
Barois et al.

(10) Patent No.: US 8,660,229 B2
(45) Date of Patent: Feb. 25, 2014

(54) NUCLEAR REACTOR PRIMARY CIRCUIT

(75) Inventors: Guy Barois, St Pancrasse (FR);
Jean-Georges Alibaud, Paris (FR);
Thierry Muller, St Helene (FR);
Christelle Dumez, Savigny sur Orge (FR)

(73) Assignee: Areva NP, Courbevoie (FR)

( * ) Notice: Subject to any disclaimer, the term of this patent is extended or adjusted under 35 U.S.C. 154(b) by 927 days.

(21) Appl. No.: 12/094,000

(22) PCT Filed: Nov. 14, 2006

(86) PCT No.: PCT/FR2006/002520
§ 371 (c)(1),
(2), (4) Date: Sep. 4, 2008

(87) PCT Pub. No.: WO2007/057559
PCT Pub. Date: May 24, 2007

(65) Prior Publication Data
US 2009/0141848 A1 Jun. 4, 2009

(30) Foreign Application Priority Data
Nov. 18, 2005 (FR) ...................................... 05 11724

(51) Int. Cl.
*G21C 7/32* (2006.01)
(52) U.S. Cl.
USPC .......................................... 376/210; 376/211
(58) Field of Classification Search
USPC ................................................. 376/210–211
See application file for complete search history.

(56) References Cited

U.S. PATENT DOCUMENTS

| 4,168,071 | A | | 9/1979 | Jacobson et al. |
| 5,452,955 | A | * | 9/1995 | Lundstrom ................ 366/163.2 |
| 5,785,361 | A | | 7/1998 | Bourbour et al. |
| 6,708,651 | B1 | | 3/2004 | Sun et al. |

FOREIGN PATENT DOCUMENTS

| EP | 0158544 | | 10/1985 | |
| EP | 0158544 | A1 * | 10/1985 | .............. F16L 55/16 |
| JP | 07027300 | | 1/1995 | |
| JP | 09304583 | | 11/1997 | |
| WO | WO-9400226 | | 1/1994 | |

* cited by examiner

*Primary Examiner* — Jack Keith
*Assistant Examiner* — Timothy A Brainard

(57) ABSTRACT

The invention relates to a nuclear reactor primary circuit comprising a primary pipeline (30), which defines an internal volume (32) and in which a primary nuclear reactor coolant downwardly runs, an additional pipeline (26) which is branched to the primary pipeline (30) and defines an internal volume communicating with the internal volume (32) of the primary pipeline (30) and a cuff (36) whose first end (50) is connected to the additional pipeline (26) and the second free end (52) is positioned in the internal volume (32) of the primary pipeline (30). According to said invention, the second end (52) is delimited by a free peripherial edge (53) comprising at least one upstream and downstream sections (56, 58) which are oriented towards the upstream, wherein the upstream section (56) penetrates into the internal volume (32) deeper from the primary pipeline (30) than the downstream section (58).

14 Claims, 3 Drawing Sheets

NUCLEAR REACTOR PRIMARY CIRCUIT

CROSS REFERENCE TO RELATED APPLICATIONS

This application is a National Phase filing under 35 U.S.C. §371 of PCT/FR2006/002520 filed Nov. 14, 2006, which claims priority to patent application Ser. No. 0511724, filed in France on Nov. 18, 2005. The entire contents of each of the above-applications are incorporated herein by reference.

The invention generally relates to nuclear reactors.

More precisely, according to a first aspect, the invention relates to a nuclear reactor primary coolant system, of the type comprising:

- a primary coolant pipe which delimits an inner space in which a primary cooling fluid of the nuclear reactor flows, the primary cooling fluid flowing from the upstream direction in a downstream direction of the primary coolant pipe;
- an additional pipe which is tapped from the primary coolant pipe, the additional pipe delimiting an inner space which communicates with the inner space of the primary coolant pipe;
- a sleeve which extends at least partially inside the additional pipe, this sleeve having a first end which is connected to the additional pipe, and a second free end which is located in the inner space of the primary coolant pipe.

Document FR-A-2 561 030 describes a system of this type. This system comprises a sleeve which terminates flush with the coolant pipe. The sleeve may also terminate with a slight recess, or penetrate therein over a short depth.

The additional pipe mentioned above is typically used to connect the charge portion of the chemical volume and control system (CVCS) to the primary coolant system. This pipe is tapped from the cold branch of the primary coolant system, that is to say, from the portion of this system which is located upstream of the nuclear reactor vessel and which connects the circulation pump of the primary cooling fluid to one of the inlets of the reactor vessel. The additional pipe allows charges of liquid originating from the CVCS to be injected into the coolant system in order to increase the volume of primary coolant liquid flowing therein or modify the chemistry of the coolant system.

The charges of liquid injected are colder than the coolant liquid flowing in the coolant system. The primary coolant pipe in the region of the mixing zone between the liquid from the CVCS and the primary coolant liquid is therefore subject to significant temperature variations when an injection is carried out via the charge line inside the primary coolant system. Furthermore, the tapping of the additional pipe from the primary coolant pipe is subject to significant thermal fluctuations which take place when the temperature difference between the charge and the cold branch is significant. These loads may bring about a fatigue of this zone of the primary coolant pipe, which may increase the risks of leakage or fracture in the region of the tapping.

In this context, the object of the invention is to provide a nuclear reactor primary coolant system in which the risk of fatigue and leakage in the region of the tapping of the additional pipe from the primary coolant pipe is reduced to a very great extent or even eliminated.

To this end, the invention relates to a primary coolant system of the type described above, characterised in that the end of the sleeve is delimited by a free peripheral edge which has at least upstream and downstream sectors which are directed in the upstream and downstream direction of the primary coolant pipe, respectively, the upstream sector penetrating more deeply into the inner space from the primary coolant pipe than the downstream sector.

The coolant system may also have one or more of the features below, taken in isolation or according to any technically possible combination:

- the upstream and downstream sectors penetrate into the inner space over first and second mean penetration depths, respectively, the first depth being greater than the second by at least 10% of the largest dimension of the cross section of the additional pipe;
- the first mean penetration depth is greater than 50% of the largest dimension of the cross section of the sleeve in the region of the free end thereof;
- the peripheral edge has a bevelled profile;
- the peripheral edge has a notched profile;
- the upstream sector extends over at least 30% of the peripheral edge;
- the sleeve comprises a contraction which terminates at the free end, the contraction having a smaller flow cross-section than that of the additional pipe;
- the contraction extends between a restriction which is formed in the sleeve and the second free end, the restriction being arranged in the connection zone of the sleeve to the additional pipe; and
- the largest dimension of the flow cross-section of the additional pipe is between 1.7 and 3 times the largest dimension of the flow cross-section of the contraction.

According to a second aspect, the invention relates to a pressurised water nuclear reactor which comprises:

- a vessel which is intended to contain nuclear fuel assemblies, this vessel being provided with at least an inlet and an outlet,
- a primary coolant system which comprises at least a cold branch which is connected to the inlet of the vessel and a hot branch which is connected to the outlet of the vessel, characterised in that the coolant system is a coolant system as described above.

The nuclear reactor may also have one or more of the following features, taken in isolation or according to any technically possible combination:

- the additional pipe is connected to a system which is capable of injecting a charge of liquid into the primary coolant pipe via the additional pipe, the additional pipe being tapped from the cold branch of the primary coolant system; and
- the reactor comprises a pressuriser which is capable of varying in a controlled manner the pressure of the primary cooling fluid in the primary coolant system, the additional pipe placing the pressuriser and the primary coolant pipe in communication and being tapped from the hot branch of the primary coolant system.

Other features and advantages of the invention will be appreciated from the description thereof given below, by way of example and in a non-limiting manner, with reference to the appended Figures, in which.

Figure 1:
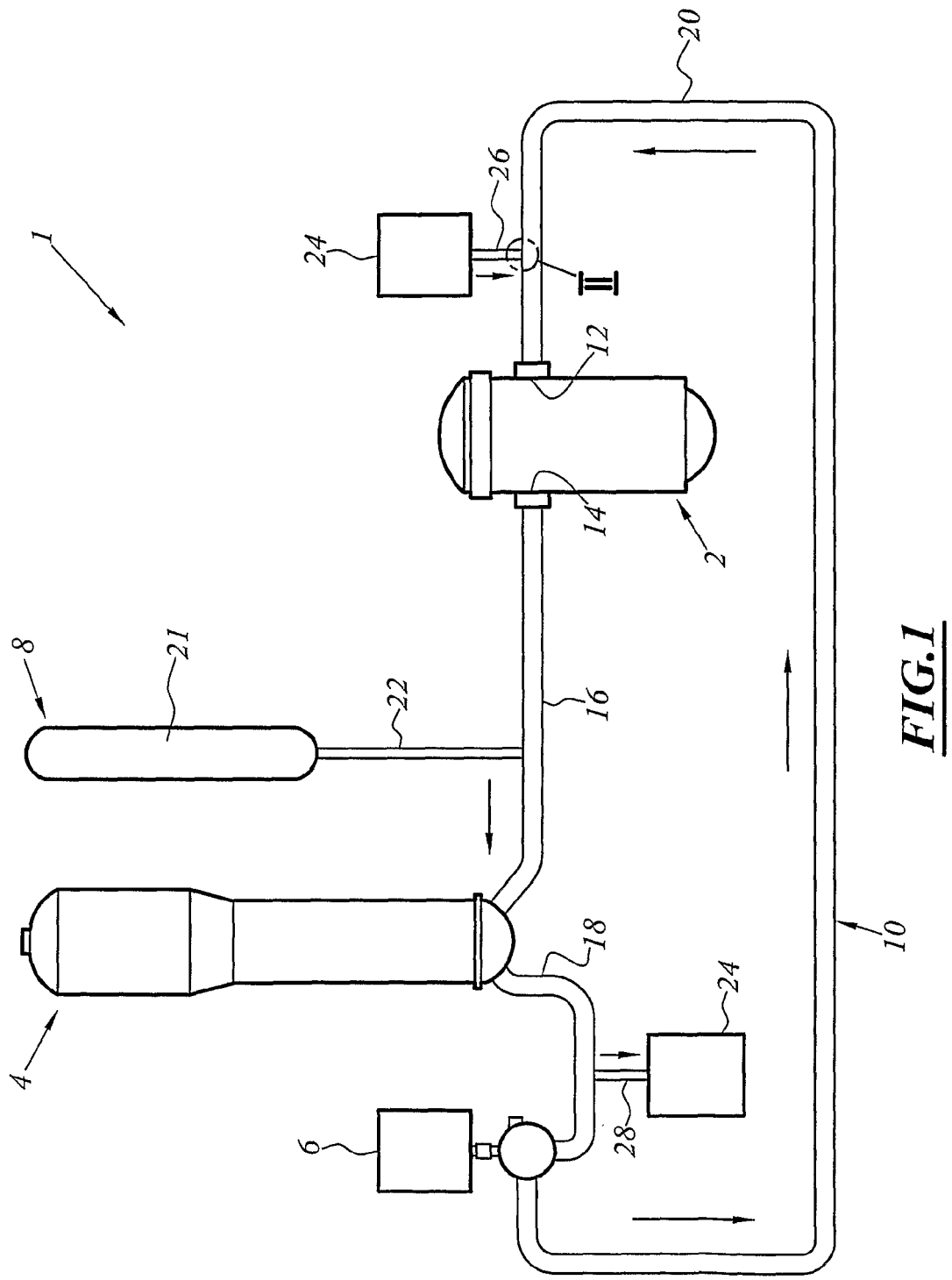
FIG. 1 is a general schematic illustration of the primary side of a pressurised water nuclear reactor according to the invention.

The nuclear reactor 1 partially illustrated in FIG. 1 comprises a vessel 2 which contains nuclear fuel assemblies, a steam generator 4, a primary coolant pump 6, a pressuriser 8 and a primary coolant system 10. The vessel 2 is provided with at least an inlet 12 and an outlet 14. The primary coolant system 10 comprises a hot branch 16 connecting the outlet 14 of the vessel 2 to the steam generator 4, a U-shaped branch 18 connecting the steam generator 4 to the primary coolant pump 6 and a cold branch 20 connecting the pump 6 to the inlet 12 of the vessel 2.

The primary coolant system 10 contains a primary coolant, typically water, which flows in a closed circuit. The primary coolant is impelled by the primary coolant pump 6 as far as the vessel 2, passes through this vessel, becoming heated in contact with the nuclear fuel assemblies, then transfers its heat to a secondary fluid flowing in a secondary system (not illustrated) when passing into the steam generator 4.

The pressuriser 8 is principally formed by a sealed fabricated casing 21 which is in communication with the inner volume of the hot branch 16 via a pipe 22 which is tapped from this hot branch 16. The casing 21 is partially filled by the primary coolant, the roof at the top of this casing 21 being occupied by pressurised water vapour which is in hydrostatic equilibrium with the primary coolant. The pressuriser 8 further comprises means (not illustrated) for varying in a controlled manner the pressure of the water vapour in the roof of the casing 21 in order to adjust the pressure of the primary coolant in the primary system 10.

The reactor also comprises a system 24 referred to as a chemical and volume control system (CVCS) which is illustrated schematically in FIG. 1. The chemical and volume control system is capable of varying in a controlled manner the volume of primary coolant flowing in the system 10, by injecting charges of fluid into the primary coolant system 10 or by withdrawing charges of fluid from this system. To this end, the primary coolant system 10 comprises a charge pipe 26 which is connected to the chemical and volume control system 24 and which is tapped from the cold branch 20 of the primary coolant system 10.

The primary coolant system 10 also comprises an extraction pipe 28 which is tapped from the bottom point of the U-shaped branch 18 of the primary coolant system 10.

Figure 2:
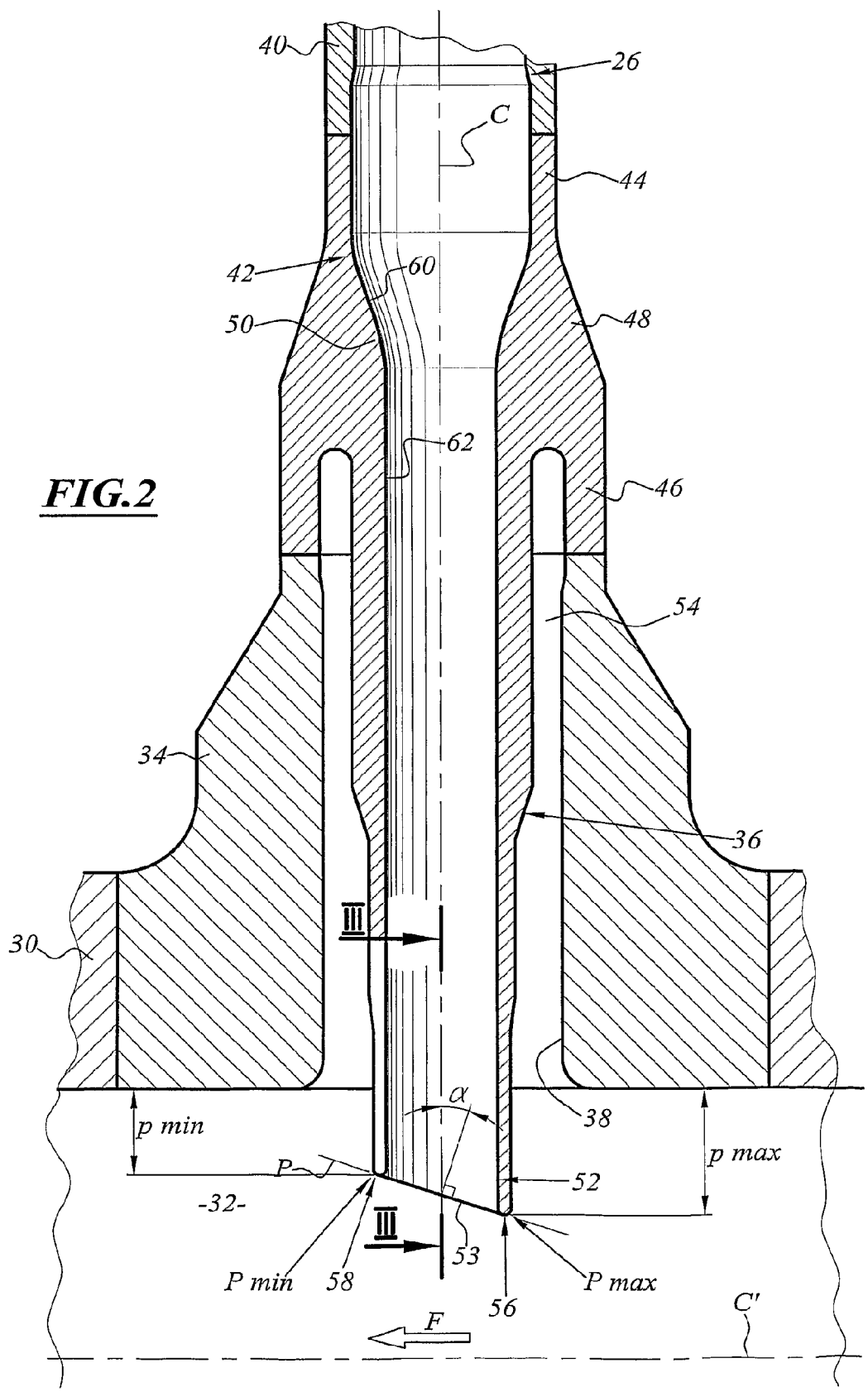
FIG. 2 is an enlarged section of a detail II of FIG. 1, illustrating the interface between the charge pipe which is connected to the chemical and volume control system and the primary coolant pipe.

The interface between the charge pipe 26 and the cold branch 20 of the primary coolant system is illustrated in FIG. 2. The cold branch 20 comprises a cylindrical primary coolant pipe 30 which delimits an inner space 32 in which the primary cooling fluid flows, said fluid flowing from the upstream direction of the primary coolant pipe, that is to say, from the pump 6, in the downstream direction of the primary coolant pipe, that is to say, towards the inlet 12 of the vessel 2. The centre axis C' of the primary coolant pipe 30 is horizontal in FIG. 2. The system also comprises a tap 34 for connecting the charge pipe 26 to the primary coolant pipe 30, and an inner protection sleeve 36.

The tap 34 is welded into an orifice of the pipe 30, and internally defines a channel 38 which branches in a substantially perpendicular manner from the inner space 32 of the pipe 30. The channel 38 is substantially cylindrical. It places the inner volume of the charge pipe 26 in communication with the inner space 32 of the primary coolant pipe 30.

The charge pipe 26 comprises a substantially cylindrical main portion 40 which has a reduced inner diameter compared with the inner diameter of the channel 38 and an intermediate portion 42 which is interposed between the main portion 40 and the tap 34.

The intermediate portion 42, the main portion 40 and the channel 38 are coaxial, having a vertical centre axis C which is perpendicular relative to the axis C' of the coolant pipe 30 or inclined at 30° relative to the vertical axis perpendicular relative to the axis of the coolant pipe 30.

The intermediate portion 42 comprises a cylindrical upper portion 44 which is welded to the main portion 40, a cylindrical lower portion 46 which is welded to the tap 34 and a frustoconical intermediate portion 48 which connects the upper and lower portions, and which has a shape which widens from the upper portion to the lower portion.

The sleeve 36 has a generally cylindrical shape, having axis C as centre axis. It has a first end 50 which is fixedly joined to the inner and outer faces of the charge pipe 26. This first end 50 has an increase in thickness with an inner portion of the frustoconical portion 48. The sleeve 36 extends, in a substantially rectilinear manner, from this first end 50 to a second free end 52 which is located in the inner volume 32 of the coolant pipe 30. The sleeve 36 therefore extends inside the portion 46 and the inner channel 38. It has a reduced outer diameter compared with the portion 46 and the inner channel 38, so that an annular zone 54 is delimited between the sleeve 36 on the one hand and the portion 46 and the tap 34 on the other hand. This zone 54 is open towards the bottom of FIG. 2 and opens in the inner space 32 of the primary coolant pipe 30. It is closed towards the top of FIG. 2 by the junction zone between the sleeve 36 and the tap 34.

Figure 3:
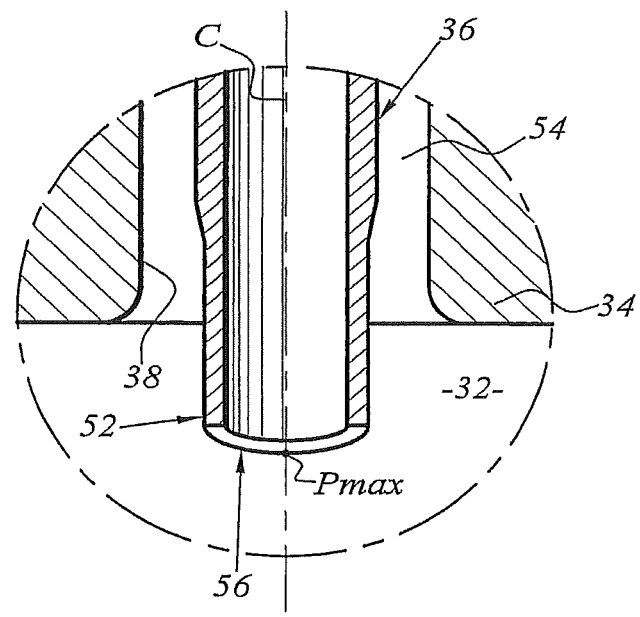
FIG. 3 is a longitudinal section of the protection sleeve of the charge pipe, viewed along the incidence of the arrows III of FIG. 2.

The second end 52 of the sleeve is delimited by a free peripheral edge 53 which has a bevelled profile. As can be seen in FIGS. 2 and 3, this peripheral edge has upstream and downstream sectors 56 and 58 which are directed in an upstream direction and a downstream direction of the coolant pipe 30, respectively. The flow direction of the primary coolant is illustrated by the arrow F of FIG. 2.

Owing to the fact that the peripheral edge 53 is bevelled, the upstream sector 56 of the peripheral edge penetrates more deeply into the inner space 32 of the coolant pipe than the downstream sector 58.

The penetration depth of a point of the peripheral edge 53 refers in this instance to the distance separating this point from the opening of the channel 38 which opens into the inner space 32, this distance being taken substantially radially relative to the centre axis C of the coolant pipe 30.

In the embodiment illustrated in this instance, the peripheral edge 53 of the sleeve is located within an inclined plane P (FIG. 2). The normal relative to this plane forms an angle α of approximately 20° relative to the axis C of the sleeve. The plane P is inclined in an upstream direction so that the point $P_{max}$ of the peripheral edge 53 which penetrates most deeply into the inner space 32 is the one which is located furthest upstream. The point $P_{min}$ of the peripheral edge 53 which penetrates least deeply is the one which is located furthest downstream, diametrically opposite the point $P_{max}$.

In the present embodiment, the penetration $p_{max}$ at the point $P_{max}$ is substantially equal to the inner diameter of the sleeve 36. The difference between the penetration at the point $P_{max}$ and the penetration $p_{min}$ at the point $P_{min}$ is approximately 30% of the outer diameter of the lower portion of the sleeve 36.

If it is considered that the upstream sector 56 corresponds to half of the peripheral edge 53 which is directed in the upstream direction of the primary coolant pipe 30 and that the downstream sector 58 corresponds to half of the peripheral edge 53 which is directed in the downstream direction of the primary coolant pipe 30, the mean penetration of the upstream sector 56 is in this instance approximately 15% greater than the mean penetration of the downstream sector 58.

Figure 4:
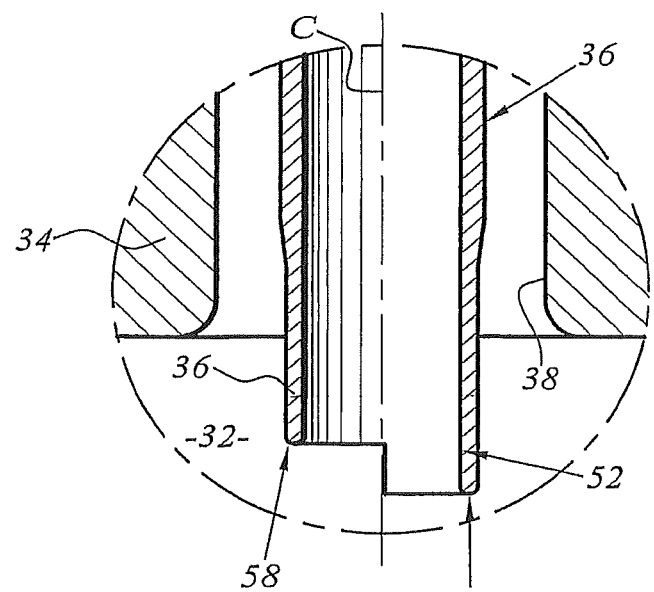
FIG. 4 is an enlarged view of the free end of the sleeve for another embodiment of the invention, viewed in section in the same plane as in FIG. 2.

The peripheral edge 53 may have other profiles, for example, a notched profile such as that illustrated in FIG. 4. The upstream sector 56 and downstream sector 58 of this edge each extend over half of the periphery of the edge. Each of the sectors has a substantially consistent penetration, the penetration difference between the upstream sector 56 and the downstream sector 58 in this instance being approximately 25% of the outer diameter of the sleeve 36.

The peripheral edge 53 may have a plurality of other profiles. Preferably, the upstream sector 56 extends over at least 30% of the periphery of the free edge 53.

Also in a preferred manner, the mean penetration depth of the upstream sector 56 is greater than the mean penetration depth of the downstream sector 58 by at least 10% of the largest dimension of the cross section of the charge pipe 26, which corresponds in this instance to the inner diameter of the charge pipe 26.

Also in a preferred manner, the mean penetration depth of the upstream sector 56 is greater than 50% of the largest dimension of the cross section of the sleeve 36 in the region of the free end 52 thereof, which corresponds in this instance to the inner diameter of the sleeve 36.

According to another optional feature of the invention which can be seen in FIG. 2, the sleeve 36 comprises, from the first end 50 thereof, a convergent portion 60 which forms a restriction, then a contraction 62 having a consistent inner cross-section which extends as far as the second end 52. The inner diameter of the sleeve 36 decreases progressively along the convergent portion 60. In the region of the first end 50, the inner diameter of the sleeve 36 is equal to the inner diameter of the main portion 40. The relationship between the diameter of the pipe 26, taken in the region of the main portion 40 thereof, and the largest dimension of the inner cross-section of the contraction 62, in this instance, the inner diameter thereof, is between 1.7 and 3.

The coolant system described above has a number of advantages.

When a charge of liquid is injected inside the primary coolant pipe 30 via the charge pipe 26, the upstream sector 56 of the free edge of the sleeve prevents the hot coolant liquid from rising inside the sleeve 36.

This upstream sector 56 penetrates more deeply than the remainder of the peripheral edge 53 in the inner space 32 of the coolant pipe.

In the absence of a sector of this type, small vortexes of hot primary coolant liquid could rise inside the sleeve 36, in particular when the flow rate of liquid through the charge pipe 26 and the sleeve 36 is low. The upstream sector 56 of the peripheral edge 53 directs these small vortexes towards the centre of the coolant pipe 30, thus limiting the risks that these small vortexes are introduced into the sleeve 36.

The portions of the charge pipe 26 which are kept in the coldest state by the charge of liquid injected into the coolant pipe are not exposed to small vortexes of hot liquid which rise from the coolant pipe.

They are therefore not subject to thermal cycles and are not exposed to the resultant loads. The long-term risk of leakage in the region of the tap of the charge pipe 26 is consequently reduced.

Furthermore, the sleeve 36 penetrates deeply into the coolant pipe 30 over a depth greater than 50% of the largest dimension of the straight portion of the sleeve in the region of the free end thereof. This has the effect of moving the mixing zone between the injected fluid and the primary coolant towards the centre of the pipe 30. The portion of the coolant pipe 30 located in the region of the mixing zone including the tap 34 is consequently subject to less significant variations of temperature.

The fact that the sleeve 36 comprises a contraction 62 having a flow cross-section which is smaller than that of the additional pipe 26 allows the fluid injected inside the coolant pipe to be accelerated. The speed of the fluid contributes to moving the mixing zone further away from the wall of the coolant pipe and the tap.

Furthermore, the fact that the convergent portion 60 of the sleeve is formed in the region of the first end 50 of this sleeve, that is to say, in the region in which the sleeve 36 is connected to the charge pipe 26, allows a thick peripheral wall to be created at this location, as illustrated in FIG. 2. This advantageously allows the mechanical strength of the connection between the sleeve 36 and the charge pipe 26 to be increased. The flow of the primary coolant in the pipe 30 creates vibrations of the sleeve 36 in particular owing to the fact that this sleeve penetrates deeply into the coolant pipe 30. These vibrations propagate from the free end 52 of the sleeve 36 as far as the junction point between the sleeve 36 and the charge pipe 26. Increasing the thickness of the material at the location of the connection therefore allows the resistance to vibrations to be increased at this location, and thus allows the service life to be increased for the sleeve 36, the charge pipe 26 and the tap 34.

The structure of the interface zone between the charge pipe 26 connected to the chemical and volume control system and the primary coolant pipe 30 has been described above. This structure can advantageously be transposed at the interface between the pipe 22 and the hot branch 16 of the primary coolant system. As has been seen above, the pipe 22 places the casing 21 of the pressuriser and the hot branch 16 of the system in communication. The mixture between the very hot fluid arriving, in some instances, from the pressuriser 8 and the primary coolant flowing in the hot branch 16 creates thermal stresses in the region of the tap of the pipe 22 from the hot branch 16. The use of a sleeve 36 as described above allows the thermal and mechanical behaviour to be improved in the region of the tap of the pipe 22.

The primary coolant system described above may have a plurality of variants.

The sleeve 36 may not have a circular inner cross-section, but instead one which is oval, or of any other shape. The convergent portion 60 which forms a restriction may not be arranged at the first end 50 of the sleeve, but may instead be offset towards the second end 52 at any point of this sleeve. The sleeve 36 may also not comprise any convergent portion 60.

FIG. 2 illustrates the charge pipe 26 and the sleeve 36 which extends perpendicularly relative to the centre axis C' of the primary coolant pipe 30. The pipe 26, the tap 34 and the sleeve 36 could also be inclined relative to the centre axis C' of the pipe 30.

The invention claimed is:

1. A nuclear reactor primary coolant system (10), comprising:
   a primary coolant pipe (30) which delimits an inner space (32) in which a primary cooling fluid of the nuclear reactor flows, the primary cooling fluid flowing from the upstream direction in a downstream direction of the primary coolant pipe (30), and the primary coolant pipe has a central axis substantially parallel to the primary cooling fluid flow direction;

an additional pipe (26) which is tapped from the primary coolant pipe (30), the additional pipe (26) delimiting an inner space which communicates with the inner space (32) of the primary coolant pipe (30);

a sleeve (36) which has a first end (50) which is connected to the additional pipe (26), and a second free end (52) which is located in the inner space (32) of the primary coolant pipe (30), the second end of the sleeve opening up toward said central axis;

wherein the second end (52) of the sleeve (36) terminates in and is delimited by a free peripheral edge (53) which has at least upstream and downstream sectors (56, 58) which are directed in the upstream and downstream direction of the primary coolant pipe (30), respectively, the upstream sector (56) penetrating more deeply into the inner space (32) from the primary coolant pipe (30) than the downstream sector (58).

2. The system according to claim 1, characterised in that the upstream and downstream sectors (56, 58) penetrate into the inner space (32) over first and second mean penetration depths, respectively, the first depth being greater than the second by at least 10% of the largest dimension of the cross section of the additional pipe (26).

3. The system according to claim 2, characterised in that the first mean penetration depth is greater than 50% of the largest dimension of the cross section of the sleeve (36) in the region of the free end (52) thereof.

4. The system according to any one of claims 1 to 3, characterised in that the peripheral edge (53) has a bevelled profile.

5. The system according to any one of claims 1 to 3, characterised in that the peripheral edge (53) has a notched profile.

6. The system according to claim 1, characterised in that the upstream sector (56) extends over at least 30% of the peripheral edge (53).

7. The system according to claim 1, characterised in that the sleeve (36) comprises a contraction (62) which terminates at the free end (52), the contraction (62) having a smaller flow cross-section than that of the additional pipe (26).

8. The system according to claim 7, characterised in that the contraction (62) extends between a restriction (60) which is formed in the sleeve (36) and the second free end (52), the restriction (60) being arranged in a connection zone of the sleeve (36) to the additional pipe (26).

9. The system according to claim 7, characterised in that the largest dimension of the flow cross-section of the additional pipe (26) is between 1.7 and 3 times the largest dimension of the flow cross-section of the contraction (62).

10. The system according to claim 1, the second end of the sleeve being tubular, wherein the upstream and downstream sectors are part of the tubular end.

11. A nuclear reactor primary coolant system (10), comprising:

a primary coolant pipe (30) which delimits an inner space (32) in which a primary cooling fluid of the nuclear reactor flows, the primary cooling fluid flowing from the upstream direction in a downstream direction of the primary coolant pipe (30);

an additional pipe (26) which is tapped from the primary coolant pipe (30), the additional pipe (26) delimiting an inner space which communicates with the inner space (32) of the primary coolant pipe (30);

a sleeve (36) which has a first end (50) which is connected to the additional pipe (26), and a second free end (52) which is located in the inner space (32) of the primary coolant pipe (30);

wherein the second end (52) of the sleeve (36) is tubular and terminates in and is delimited by a free peripheral edge (53) which has at least upstream and downstream sectors (56, 58), the upstream and downstream sectors being part of the second end of the sleeve and being directed in the upstream and downstream direction of the primary coolant pipe (30), respectively, the upstream sector (56) penetrating more deeply into the inner space (32) from the primary coolant pipe (30) than the downstream sector (58).

12. The system according to claim 11, the second end of the sleeve being substantially cylindrical.

13. The system according to claim 11, wherein the free peripheral edge has a closed contour.

14. A nuclear reactor primary coolant system (10), comprising:

a primary coolant pipe (30) which delimits an inner space (32) in which a primary cooling fluid of the nuclear reactor flows, the primary cooling fluid flowing from the upstream direction in a downstream direction of the primary coolant pipe (30);

an additional pipe (26) which is tapped from the primary coolant pipe (30), the additional pipe (26) delimiting an inner space which communicates with the inner space (32) of the primary coolant pipe (30);

a sleeve (36) which has a first end (50) which is connected to the additional pipe (26), and a second free end (52) which is located in the inner space (32) of the primary coolant pipe (30);

wherein the second end (52) of the sleeve (36) terminates in an opening delimited by a free peripheral edge (53) having at least upstream and downstream sectors (56, 58) directed in the upstream and downstream direction of the primary coolant pipe (30), respectively, the upstream sector (56) penetrating more deeply into the inner space (32) from the primary coolant pipe (30) than the downstream sector (58).

\* \* \* \* \*